BEST AVAILABLE COPY

United States Statutory Invention Registration [19]

[11] Reg. Number: H269

Malik

[43] Published: May 5, 1987

[54] DISINFECTANT AND/OR SANITIZING CLEANER COMPOSITIONS

[75] Inventor: Arshad H. Malik, Decatur, Ill.

[73] Assignee: A. E. Staley Manufacturing Company, Decatur, Ill.

[21] Appl. No.: 709,965

[22] Filed: Mar. 11, 1985

[51] Int. Cl.[4] ..... C11D 3/48

[52] U.S. Cl. ..... 422/37; 252/106; 252/174.17; 252/528; 252/547

[58] Field of Search ..... 422/37; 252/106, 174.17, 252/528, 547

[56] References Cited

U.S. PATENT DOCUMENTS

| | | | |
|---|---|---|---|
| 3,308,067 | 3/1967 | Diehl . | |
| 3,591,510 | 7/1971 | Zenk . | |
| 3,717,630 | 2/1973 | Booth | 548/463 X |
| 3,723,322 | 3/1973 | Diehl . | |
| 4,065,409 | 12/1977 | Flanagan . | |
| 4,144,226 | 3/1979 | Crutchfield . | |
| 4,146,495 | 3/1979 | Crutchfield . | |
| 4,174,304 | 11/1979 | Flanagan . | |
| 4,203,872 | 5/1980 | Flanagan | 252/106 X |
| 4,259,217 | 3/1981 | Murphy | 252/528 X |
| 4,264,479 | 4/1981 | Flanagan | 252/106 X |
| 4,336,152 | 6/1982 | Like et al. | 252/528 X |
| 4,443,363 | 4/1984 | Klinger et al. | 252/528 X |
| 4,443,364 | 4/1984 | Klinger et al. | 252/528 X |
| 4,455,250 | 6/1984 | Frazier | 252/106 |
| 4,483,779 | 11/1984 | Llenado . | |
| 4,493,773 | 1/1985 | Cook et al. | 252/174.17 X |
| 4,540,505 | 9/1985 | Frazier | 252/528 X |

FOREIGN PATENT DOCUMENTS

| | | |
|---|---|---|
| 666781 | 8/1966 | South Africa . |
| 0070074 | 1/1983 | European Pat. Off. . |
| 0070075 | 1/1983 | European Pat. Off. . |
| 0070076 | 1/1983 | European Pat. Off. . |
| 0070077 | 1/1983 | European Pat. Off. . |
| 0075994 | 4/1983 | European Pat. Off. . |
| 0075995 | 4/1983 | European Pat. Off. . |
| 0075996 | 4/1983 | European Pat. Off. . |
| 0105556 | 4/1984 | European Pat. Off. . |
| 0106692 | 4/1984 | European Pat. Off. . |

OTHER PUBLICATIONS

"Formulating Quaternary Cleaner Disinfectants to Meet EPA Requirements" by Greene & Petrocci, Soap/Cosmetics/Chemical Specialties, Aug. 1980, pp. 33–35 and 61.

"A Greasy Soil Hard Surface Cleaning Test" by Morris A. Johnson, JAOCS, vol. 61, No. 4, pp. 810–813.

"Formulation of Hard Surface Spray Cleaners" by R. E. Johnson & E. T. Clayton, Detergents and Specialties, Jun. 1969, pp. 28–32 and 56.

Official Method of Analysis of the Association of Official Analytical Chemists", 13th Edition, Washington, DC, 1980, p. 58.

*Primary Examiner*—John F. Terapane
*Assistant Examiner*—Susan Wolffe

[57] ABSTRACT

Liquid disinfectant and/or sanitizer cleaning compositions are provided in the form of homogeneous aqueous solutions which comprise water, a germicidal quaternary ammonium halide compound and a glycoside surfactant and in which the weight ratio of the quaternary ammonium halide compound to the glycoside surfactant is at least 0.65.Such compositions may also optionally include additional ingredients such as water soluble detergent builders, water miscible organic solvents, hydrotropes, perfumes, dyes, colorants, thickeners, soil suspending agents, deodorizers, ammonia, aerosol propellants and the like.

17 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISINFECTANT AND/OR SANITIZING CLEANER COMPOSITIONS

BACKGROUND OF THE INVENTION

The present invention pertains to aqueous disinfectant and/or sanitizing cleaning compositions containing a germicidal quaternary ammonium halide compound and a glycoside surfactant material and to the use of such compositions for disinfecting and/or sanitizing surfaces, articles, etc. contaminated with undesired bacterial, fungal and/or viral organisms.

Alkyl glycoside materials such as, for example, higher alkyl monoglycosides and higher alkyl polyglycosides are known materials; are known, at least in certain circumstances, to function as nonionic surfactants; and have been suggested as being suitable for use in certain specially formulated detergent compositions. See in this regard, for example, Published European Patent Application Nos. 0070074; 0070075; 0070076; and 0070077, all of which published on Jan. 19, 1983 as well as Published European Patent Application Nos. 0075994; 0075995; and 0075996 which published on Apr. 6, 1983. See also Published European Patent Application No. 0105556 (published Apr. 18, 1984) which discloses liquid detergent compositions containing anionic surfactants, alkylpolyglycoside surfactants, selected nonionic surfactants and optionally also containing various other ingredients such as suds, stabilizing amine oxide surfactants, detergent builder materials, and the like; Published European Patent Application No. 0106692 (published Apr. 25, 1984) which discloses stable heavy-duty liquid detergent compositions containing a mixture of an ethoxylated fatty alcohol nonionic surfactant, an aklylpolyglycoside surfactant and a quaternary ammonium cationic surfactant in conjunction with a polyethylene glycol compound and a wide variety of optional conventional laundry detergent additives; and U.S. Pat. No. 4,493,773 (issued Jan. 15, 1985) which discloses laundry detergent compositions which contain a conventional nonionic detergent surfactant, an alkylpolyglycoside detergent surfactant and a quaternary ammonium cationic fabric softening surfactant and which are said to be capable of including a wide variety of conventional laundry detergent additives such as relatively small amounts of detergent buildings, detergency cosurfactants such as trialkyl amine oxides, solvents such as ethanol, and the like.

A relatively specialized category of cleaning coposition of interest to the art is one which is often referred to as a liquid detergent hard surface cleaning composition and which is specifically designed or formulated such that it can be applied to a soiled hard surface of interest (e.g., glass, painted walls, woodwork, etc.) and removed therefrom (for example as by wiping with a dry or damp cloth) without a subsequent rinsing operation and without leaving a significant or unsightly residual film upon the surface after cleaning. Thus, for example, in Published South African Patent Application No. 666,781 there is described a hard surface cleaner composition which comprises from 1–10% of an anionic surfactant (e.g., alkyl sulfate or alkyl aryl sulphonate) or a nonionic surfactant (e.g., an ethylene oxide condensate of a fatty alcohol or of an alkyl phenol) and at least 20% of a 1:1 to 4:1 ratio mixture of an alkali metal (or ammonium) borate and sodium carbonate and which, at a 1% concentration in water, has a pH of at least 9.6

On the other hand, U.S. Pat. No. 3,591,510 to William Edward Zenk (issued July 6, 1971) describes certain liquid hard surface cleaning compositions consisting essentially of from about 0.25 to 4% of certain selected anionic or zwitterionic detergents; from about 0.5 to about 6% of certain water soluble builder components; from about 1 to about 10% of certain selected organic solvents or solvent mixtures; and the balance being water.

In a recent journal article, namely "A Greasy Soil Hard Surface Cleaning Test" by Morris A. Johnson, *JAOCS*, vol. 61, No. 4, pages 810–813 (April 1984), a series of commercially available solvent-based and water-based cleaners were tested for greasy soil removal effectiveness at various dilution ratios.

Hard surface cleaning formulations are also discussed in "Formulation of Hard Surface Spray Cleaners" by R. E. Johnson and E. T. Clayton, *detergents and specialties*, June 1969, pages 28–32 and 56. Formulations discussed in such article includes (a) one which was composed of 1 weight percent of a nonionic surfactant (linear alcohol ethoxylate), 2.5 weight percent of anhydrous tetrapotassium pyrophosphate (builder), 5 weight percent of ethylene glycol monobutyl ether (solvent) and the balance water and (b) another which was the same as the former except that the indicated nonionic surfactant was replaced with a corresponding amount of a linear alkylbenzenesulfonate anionic surfactant. In said article, it is noted that the aforementioned nonionic surfactant-based formulation exhibited slightly more filming (i.e., being given a "moderate" film rating) than its corresponding anionic surfactant-based counter-part (which obtained a "moderate-good" film rating).

In U.S. Pat. No. 4,065,409 to John J. Flanagan (issued Dec. 27, 1977), there are disclosed certain liquid detergent compositions which comprise aqueous solutions containing certain selected ethoxylated nonionic surfactants in combination with certain amine oxide and quaternary ammonium halide surfactant components. Such compositions are described as being useful as hard surface detergents for cleaning surfaces such as painted wood, plaster or wall board; tile; glass; metal; linoleum and the like. The combination of the three surfactant ingredients indicated above is said to exhibit improved detergent properties relative to those exhibited by compositions containing any one or two of said ingredients at equivalent concentrations.

In U.S. Pat. No. 4,174,304 to John J. Flanagan (issued Nov. 13, 1979), surfactant systems comprising, in certain specified proportions, a combination of certain ethoxylated nonionic, amine oxide and quaternary ammonium halide surfactant components are described as being suitable, in combination with certain other specified ingredients (such as antifoaming agents, water softening agents, viscosity reducing agents, builders and the like) in the preparation of a wide variety of commercially useful cleaning formulations such as, for example, degreasing cleaner compositions; wax and floor finish stripper compositions; glass and smooth surface cleaning and polishing compositions; and the like.

The development, evaluation and Environmental Protection Agency (EPA) labeling requirements for cleaner disinfectant compositions such as, for example, those containing quaternary ammonium halide compounds, nonionic detergents and detergent builder ingredients are discussed in an article entitled "Formulating Quaternary Cleaner Disinfectants to Meet EPA Requirements" by Donald F. Greene and Alfonso N.

Petrocci, *SOAP/COSMETICS/CHEMICAL SPECIALTIES*, August 1980, pages 33–35 and 61.

SUMMARY OF THE INVENTION

It has now been discovered that glycoside surfactants can be suitably employed as the nonionic surfactant component in aqueous disinfectant or sanitizer cleaning compositions of the sort mentioned in the above-identified article by Greene and Petrocci. Additionally, it has also been discovered that glycoside surfactants are particularly effective in such compositions when ethylene diamine tetraacetic acid or alkali metal salts thereof are employed as a detergent builder ingredient.

Accordingly, the present invention, in one aspect, is a liquid disinfectant and/or sanitizer cleaning composition which, on a total composition weight basis, comprises:

a. from about 0.01 to about 50 weight percent of a germicidal quaternary ammonium halide compound;

b. from about 0.01 to about 50 weight percent of a glycoside surfactant; and c. from about 10 to about 99.98 weight percent water; and in which the weight ratio of the quaternary ammonium halide compound to the glycoside surfactant is at least about 0.65:1 (preferably at least about 0.8:1).

Such compositions may also optionally include:

1. from 0 to about 50 weight percent of a water soluble detergent builder;
2. from 0 to about 50 weight percent of a water miscible organic solvent; and
3. from 0 to a total of about 50 weight percent of one or more discretionary ingredients selected from the group consisting of hydrotropes, perfumes, dyes, colorants, thickeners, soil suspending agents, deodorizers, ammonia, antioxidants, and aerosol propellants.

The disinfectant and/or sanitizer cleaning composition of the present invention can, if desired, suitably take the form of a dilutable liquid concentrate for the purposes of its convenient and economical initial manufacturing or formulation operations, transport or distribution, and/or marketing and can then be subsequently diluted (e.g., by the final distributor or the ultimate user) with water prior to its ultimate use in cleaner/sanitizer or cleaner/disinfectant end-use applications.

In their aforementioned concentrated form, the compositions of the present invention will typically comprise, on a total concentrate composition weight basis:

a. from about 10 to about 50 (preferably from about 10 to about 30) weight percent of the germicidal quaternary ammonium halide compound;

b. from about 10 to about 50 (preferably from about 10 to about 30) weight percent of the glycoside surfactant;

c. from about 10 to about 80 (preferably from about 20 to about 70 and more preferably from about 30 to 40 to about 50 or 60) weight percent water; and d. optionally, up to about 50 (preferably up to about 30) weight percent of a water soluble detergent builder; up to about 50 (preferably up to about 30) weight percent of a water miscible organic solvent; and/or up to a combined total of about 50 (preferably up to a combined total of about 30) weight percent of one or more of the above-noted discretionary ingredients.

When the foregoing compositions ae diluted to their ready-to-use form (i.e., for their intended cleaning-/disinfecting or cleaning/sanitizing purposes), they will typically contain, on a total composition weight basis:

a. from about 0.01 to about 10 (preferably from about 0.01 to about 5, more preferably from about 0.02 to about 3 and most preferably from about 0.02 to about 1.5) weight percent of the germicidal quaternary ammonium halide compound;

b. from about 0.01 to about 10 (preferably from about 0.01 to about 5, more preferably from about 0.02 to about 3 and most preferably from about 0.05 to about 1.5) weight percent of the glycoside surfactant; and c. from about 50 to about 99.98 (preferably from about 70 to about 99.98, more preferably from about 75 to about 99.96 and most preferably from about 90 to about 99.93) weight percent water.

The above described diluted compositions can, if desired, also optionally include, on a total composition weight basis:

1. from 0 to about 10 (preferably from 0 to about 5 and more preferably from 0 to about 3) weight percent of a water soluble detergent builder;
2. from 0 to about 10 (preferably from 0 to about 5 and more preferably from 0 to about 3) weight percent of a water miscible organic solvent; and
3. from 0 to about 10 (preferably from 0 to about 5 and more preferably from 0 to about 3) weight percent of one or more discretionary auxiliary ingredients selected from the group consisting of hydrotropes, perfumes, dyes, colorants, thickeners, soil suspending agents, deodorizers, ammonia, antioxidants and aerosol propellants.

In one of its aspects, the present invention is also a method for cleaning and disinfecting and/or sanitizing a surface or an article contaminated with undesired bacterial, viral and/or fungal organisms. In said method, the aforementioned diluted compositions, containing at least a sanitizing or disinfecting amount of the germicidal quaternary ammonium halide compound, is contacted with said contaminated surface or article in a fashion so as to suitably sanitize or disinfect same. Typically, said compositions will contain, on a toal composition weight basis, at least about 0.01 weight percent (preferably about 0.02 weight percent or more) of the germicidal quaternary ammonium halide compound for sanitizing purposes and at least about 0.05 (preferably at least about 0.07) weight percent of same for disinfectant end-use applications.

In a particularly preferred embodiment of the present invention, the weight ratio of the germicidal quaternary ammonium halide compound to the glycoside surfactant will be at least about 1:1. Preferably the weight ratio of the germicidal quaternary ammonium halide compound to the glycoside surfactant will generally be within the range of from about 1:1 to about 10:1 (most preferably from about 1:1 to about 2:1).

DETAILED DESCRIPTION OF THE INVENTION

Germicidal quaternary ammonium halide compounds suitable for use in the present invention include higher (e.g. $C_8$–$C_{22}$) alkyl trimethyl ammonium halides; higher alkyl dimethyl benzyl ammonium halides; mixed higher alkyl (e.g., mixed $C_{14}$, $C_{16}$, $C_{12}$ and $C_{18}$ alkyl) dimethyl benzyl ammonium halides; twin long-chain dialkyl dimethyl ammonium halides such as didecyl dimethyl ammonium halides, dioctyl dimethyl ammonium halides, etc.; lower alkylsubstituted benzyl quaternaries such as higher alkyl dimethyl ethylbenzyl ammonium halides; and the like.

Glycoside surfactants suitable for use in the practice of the present invention include those of the formula:

$$RO(R'O)_y(Z)_x \quad \text{I}$$

wherein R is a monovalent organic radical (e.g., a monovalent saturated aliphatic, unsaturated aliphatic or aromatic radical such as alkyl, hydroxyalkyl, alkenyl, hydroxyalkenyl, aryl, alkylaryl, hydroxyalkylaryl, arylalkyl, alkenylaryl, arylalkenyl, etc.) containing from about 6 to about 30 (preferably from about 8 to about 18 and more preferably from about 9 to about 13) carbon atoms; R' is a divalent hydrocarbon radical containing from 2 to about 4 carbon atoms such as ethylene, propylene or butylene (most preferably the unit $(R'O)_y$ represents repeating units of ethylene oxide, propylene oxide and/or random or block combinations thereof); y is a number having an average value of from 0 to about 12; Z represents a moiety derived from a reducing saccharide containing 5 or 6 carbon atoms (most preferably a glucose unit); and x is a number having an average value of from 1 to about 10) preferably from 1 to about 5 and most preferably from 1 to about 3).

Glycoside surfactants of the sort mentioned above, and various preferred subgenera thereof, are fully discussed in U.S. Pat. No. 4,483,779 to Llenado et al. (issued Nov. 20, 1984), the discussion and description of which is hereby incorporated by reference.

Glycoside surfactants suitable for use herein also include those of the formula I above in which one or more of the normally free (i.e., unreacted) hydroxyl groups of the saccharide moiety, Z, have been alkoxylated (preferably, ethoxylated or propoxylated) so as to attach one or more pendant alkoxy or poly (alkoxy) groups in place thereof. In such instance, the amount of alkylene oxide (e.g., ethylene oxide, propylene oxide, etc.) employed will generally correspond to from about 1 to about 20 (preferably from about 3 to about 10) moles thereof per mole of saccharide moiety.

In glycosides of the formula I above, the $RO(R'O)_y$ group is generally bonded or attached to the number 1 carbon atom of the saccharide moiety, Z. Accordingly, the free hydroxyls available for alkoxylation are typically those in the number 2, 3, 4 and 6 positions in 6-carbon atom saccharides and those in the number 2, 3 and 4 positions in 5-carbon atom saccharide species. Typically, the number 2 position hydroxyl in 5-carbon saccharides, and the number 2 and 6 position hydroxyls in 6-carbon saccharides, are substantially more reactive or susceptable to alkoxylation than those in the number 3 and 4 positions. Accordingly, alkoxylation will usually occur in the former locations in preferance to the latter. Examples of the indicated alkoxylated glycoside materials, and of methodology suitable for the preparation of same, are described in U.S. patent application Ser. No. 06/704,728 filed Feb. 22, 1985 by Roth et al.

Glycoside surfactants of particular interest for use in the practice of the present invention preferably have a hydrophilic-lipophilic balance (HLB) in the range of from about 10 to about 18 and most preferably in the range of from about 12 to about 14.

Water soluble detergent builders suitable for use herein include the various water soluble alkali metal, ammonium or substituted ammonium phosphates, polyphosphates, phosphonates, polyphosphonates, carbonates, silicates, borates, polyhydroxysulfonates, polyacetates, carboxylates, and polycarboxylates. Preferred are the alkali metal, especially sodium, salts of the above.

Specific examples of suitable water soluble inorganic phosphate builders are sodium and potassium tripolyphosphate, pyrophosphate, polymeric metaphosphate having a degree of polymerization of from about 6 to 21, and orthophosphate. Examples of polyphosphonate builders are the sodium and potassium salts of ethylene-1,1-diphosphonic acid, the sodium and potassium salts of ethane-1,1,2-triphosphonic acid.

Examples of suitable water soluble nonphosphorus, inorganic builders for use herein include sodium and potassium carbonate, bicarbonate, sesquicarbonate, tetraborate decahydrate, and silicate having a molar ratio of $SiO_2$ to alkali metal oxide of from about 0.5 to about 4.0, preferably from about 1.0 to about 2.4.

Water soluble, nonphosphorus organic builders useful herein also include the various alkali metal, ammonium and substituted ammonium polyacetates, carboxylates, polycarboxylates and polyhydroxysulfonates. Examples of polyacetate and polycarboxylate builders include the sodium, potassium, lithium, ammonium and substituted ammonium salts of ethylenediamine tetraacetic acid, nitrilotriacetic acid, oxydisuccinic acid, mellitic acid, benzene polycarboxylic acids, and citric acid.

Polycarboxylate builders suitable for use herein also include those set forth in U.S. Pat. No. 3,308,067, Diehl, issued Mar. 7, 1967 incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylenemalonic acid.

Other builders include the carboxylated carbohydrates of U.S. Pat. No. 3,723,322 Diehl incorporated herein by reference.

Other useful builders herein include sodium and potassium carboxymethyloxymalonate, carboxymethyloxysuccinate, cis-cyclohexanehexacarboxylate, cis-cyclopentanetetracarboxylate, phloroglucinol trisulfonate, water-soluble polyacrylates (having molecular weights of from about 2,000 to about 200,000 for example), and the copolymers of maleic anhydride with vinyl methyl ether or ethylene.

Other suitable polycarboxylates for use herein include the polyacetal carboxylates described in U.S. Pat. No. 4,144,226, issued Mar. 13, 1979 to Crutchfield et al. and U.S. Pat. No. 4,146,495 issued Mar. 27, 1979 to Crutchfield et al. both incorporated herein by reference.

Organic builders of the type described in pending U.S. patent application Ser. No. 06/664,451 by Valenty (filed Oct. 23, 1984) can also be suitably employed in the compositions of the present invention.

Preferred water soluble detergent builders for use herein include ethylene diamine tetraacetic acid or the alkali metal salts thereof, tetrapotassium pyrophosphate and sodium carbonate. Of these ethylene diamine tetraacetic acid and its alkali metal salts are especially preferred.

Water miscible organic solvents suitable for use in the compositions of the present invention include alkylene glycols and/or ethers thereof (e.g., mono-lower alkyl, $C_1$ to $C_6$, ethers thereof) such as, for example, ethylene glycol mono-n-butyl ether, ethylene glycol monomethyl ether, ethylene glycol monoethyl ether, ethylene glycol mono-n-hexyl ether, propylene glycol monomethyl ether, propylene glycol monoethyl ether, isopropylene glycol monoethyl or monopropyl or monobutyl ether, etc; polyalkylene glycols and/or ethers thereof (e.g. mono-lower alkyl, $C_1$ to about $C_6$, ethers thereof) such as, for example, diethylene glycol monoethyl or monopropyl or monobutyl ether, di- or tripropylene glycol monomethyl ether, di- or tripropylene glycol monoethyl ether, etc.; t-butyl alcohol; tetrahydrofurfuryl alcohol; N-methyl-2-pyrrolidone; and the like.

As has been noted above, the compositions of the present invention can also, if desired in a given instance, suitably include one or more of the various known types of supplemental or auxiliary ingredients or additives such as, for example, hydrotropes (e.g., water soluble salts of low molecular weight organic acids such as the sodium or potassium salts of toluene-, benzene-, xylene-, or cumene sulfonic acid, sodium or potassium sulfosuccinate, etc); perfumes; dyes or colorants; thickeners and/or soil suspending agents (e.g., carboxymethyl cellulose, sodium polyacrylate, polyethylene glycols having molecular weights of from about 400 to about 100,000); deodorizers; ammonia; antioxidants; aerosol propellants; and the like. Typically, such supplemental or auxiliary ingredients will be employed in relatively minor proportions.

In the preparation of the aqueous disinfectant and/or sanitizing cleaner compositions hereof, there is typically no particular criticality associated with the order of ingredient addition or the technique employed in manufacturing or formulating same and such can therefore be accomplished in any fashion that may be convenient or expedient under the circumstances to provide the subject composition of interest in the form of a stable, homogeneous aqueous solution thereof.

As has been noted above, the compositions of the present invention, if desired, can suitably be initially formulated, transported, distributed and/or marketed in the form of a dilutable aqueous concentrate composition and, in such event, can be diluted to the ultimately desired, end-use active ingredient strength by the eventual end-user or by a distributor at the retail or wholesale level. Alternatively, the compositions hereof can also suitably be initially and directly manufactured or formulated, transported, and marketed in their diluted, ready-to-use form as previously described in accordance with the present invention.

In evaluating the relative cleaning effectiveness of the subject cleaning/disinfecting and/or cleaning/sanitizing compositions, it is convenient to employ a Gardner Washability Apparatus (using a standard soil tile and at standard pressure and sponge stroke settings), to determine or quantify the cleaning efficiency of a given composition of interest. In determining the cleaning efficiency, reflectance values are determined using a Gardner Lab Scan Reflectometer for each of the following: a clean unsoiled panel, a soiled panel and a soiled panel following washing or scrubbing with a Gardner Washability Apparatus. Such reflectance values are then employed to calcuate % cleaning efficiency according to the following formula:

$$\% \text{ cleaning efficiency} = \frac{Rw - Rs}{Ro - Rs} \times 100\%$$

wherein:
$Rw$ = Reflectance of the washed tile or panel
$Rs$ = Reflectance of the soiled tile or panel and
$Ro$ = Reflectance of the clean, unsoiled tile or panel.

The disinfecting and/or sanitizing effectiveness of the compositions of the present invention can be conveniently determined in accordance with the Association of Official Analytical Chemists (AOAC) Use Dilution Test as described in the *Official Method of Analysis of the Association of Official Analytical Chemists*, 13th Edition, Washington D.C., 1980, page 58.

The present invention is further illustrated and understood by reference to the following examples thereof in which all parts and percentages are on a weight basis unless otherwise indicated.

EXAMPLES 1 AND 2

In these example, the aqueous disinfectant cleaner compositions described in Table I below are prepared and are evaluated as to their disinfecting and cleaning effectiveness in accordance with the test procedure described above.

The formulations of Examples 1 and 2 each employ a glycoside surfactant and are within the scope of the present invention. Controls 1 and 2 employ a commercially available ethoxylated nonlyphenol nonionic surfactant (9.5 mole ethylene oxide per mole of nonylphenol) in place of the glycoside surfactant and are presented and evaluated for comparative purposes.

The results of the cleaning efficiency and disinfectant effectiveness evaluations are summarized in Table I.

TABLE I

| Ingredients[1] | Example 1 | Control 1 | Example 2 | Control 2 |
|---|---|---|---|---|
| Quaternary Ammonium Halide[2] | 4.5 | 4.5 | 4.5 | 4.5 |
| Glycoside Surfactant[3] | 4.5 | None | 4.5 | None |
| Conventional Nonionic Surfactant[4] | None | 4.5 | None | 4.5 |
| $Na_2CO_3$ | 3.0 | 3.0 | 3.0 | 3.0 |
| EDTA[5] | 2.85 | 2.85 | None | None |
| Tetra Potassium Pyrophosphate | None | None | 2.0 | 2.0 |
| Water | 85.15 | 85.15 | 86.0 | 86.0 |
| TOTAL | 100.0 | 100.0 | 100.0 | 100.0 |
| % CLEANING EFFICIENCY[6] | 24.9% | 10.7% | 7.3% | 14.3% |
| DISINFECTANT | Pass | Pass | Pass | Pass |

TABLE I-continued

| Ingredients[1] | Example 1 | Control 1 | Example 2 | Control 2 |
|---|---|---|---|---|
| EFFECTIVENESS[6] | | | | |

[1]Ingredients stated in parts by weight and on an active ingredient only basis.
[2]Quaternary Ammonium Halide = 1:1 weight ratio mixture of (a) n-alkyl ($C_{14}$ = 60%, $C_{16}$ = 30%, $C_{12}$ = 5% and $C_{18}$ = 5%) dimethyl benzyl ammonium chloride and (b) n-alkyl ($C_{12}$ = 50%, $C_{14}$ = 30%, $C_{16}$ = 17% and $C_{18}$ = 3%) dimethyl ethylbenzyl ammonium chloride.
[3]Glycoside Surfactant = alkyl ($C_{12}$–$C_{13}$) polyglucoside (degree of polymerization = 3.0).
[4]Conventional Nonionic Surfactant = Ethoxylated nonylphenol (9.5 moles ethylene oxide per mole of nonylphenol).
[5]EDTA = Tetrasodium salt of ethylene diamine tetraacetic acid.
[6]Diluted 1 part formulation: 64 parts water (703 ppm of quaternary ammonium halide) for disinfectant effectiveness testing and for cleaning effectiveness testing.

While the present invention has been described and illustrated by reference to certain specific embodiments and examples thereof, such is not to be interpreted as in any way limiting the scope of the instantly claimed invention.

What is claimed is:

1. A liquid disinfectant and/or sanitizing cleaner composition which, on a total composition weight basis, comprises:

a. from about 0.01 to about 50 weight percent of a germicidal quaternary ammonium halide compound;
b. from about 0.01 to about 50 weight percent of a glycoside surfactant;
c. from about 0.01 to about 50 weight percent of ethylene diamine tetraacetic acid or alkali metal salts thereof; and
d. from about 10 to about 99.98 weight percent water; and in which the weight ratio of the germicidal quaternary ammonium halide compound to the glycoside surfactant is at least about 0.65:1.

2. The composition of claim 1 wherein the weight ratio of the germicidal quaternary ammonium halide compound to the glycoside surfactant is at least about 1:1.

3. The composition of claim 2 in the form of a dilutable liquid concentrate in which, on a total composition weight basis:

a. the germicidal quaternary ammonium halide compound constitutes from about 10 to about 50 weight percent;
b. the glycoside surfactant constitutes from about 10 to about 50 weight percent;
c. the ethylene diamine tetraacetic acid or alkali metal salt thereof constitutes from about 10 to about 50 weight percent; and
d. water constitutes from about 10 to about 80 weight percent.

4. The composition of claim 1 in the form of a dilutable liquid concentrate in which, on a total composition weight basis:

a. the germicidal quaternary ammonium halide compound constitutes from about 10 to about 30 weight percent;
b. the glycoside surfactant constitutes from about 10 to about 30;
c. the ethylene diamine tetraacetic acid or alkali metal salt thereof constitutes from about 10 to about 30 weight percent; and
d. water constitutes from about 10 to about 80 weight percent.

5. The composition of claim 4 wherein the weight ratio of the germicidal quaternary ammonium halide compound to the glycoside surfactant is at least about 1:1.

6. The composition of claim 1 in the form of a ready to use sanitizing and/or disinfectant cleaning composition in which, on a total composition weight basis:

a. the germicidal quaternary ammonium halide compound constitutes from about 0.01 to about 10 weight percent;
b. the glycoside surfactant constitutes from about 0.01 to about 10 weight percent;
c. the ethylene diamine tetraacetic acid or alkali metal salt thereof constitutes from about 0.01 to about 10 weight percent; and
d. water constitutes from about 50 to about 99.98 weight percent.

7. The composition of claim 6 wherein the weight ratio of the germicidal quaternary ammonium halide compound to the glycoside surfactant is at least about 1:1.

8. The composition of claim 1 wherein the weight ratio of the germicidal quaternary ammonium halide compound to the glycoside surfactant is in the range of from about 1:1 to about 10:1.

9. The composition of claim 1 wherein the weight ratio of the germicidal quaternary ammonium halide compound to the glycoside surfactant is in the range of from about 1:1 to about 2:1.

10. The composition of claim 4 wherein the weight ratio of the germicidal quaternary ammonium halide compound to the glycoside surfactant is in the range of from about 1:1 to about 10:1.

11. The composition of claim 4 wherein the weight ratio of the germicidal quaternary ammonium halide compound to the glycoside surfactant is in the range of from about 1:1 to about 2:1.

12. The composition of claim 6 wherein the weight ratio of the germicidal quaternary ammonium halide compound to the glycoside surfactant is in the range of from about 1:1 to about 10:1.

13. The composition of claim 6 wherein the weight ratio of the germicidal quaternary ammonium halide compound to the glycoside surfactant is in the range of from about 1:1 to about 2:1.

14. A method of sanitizing a hard surface which comprises applying thereto a liquid sanitizing cleaning composition which on a total composition weight basis, comprises:

a. from about 0.01 to about 10 weight percent of a germicidal quaternary ammonium halide compound;
b. from about 0.01 to about 10 weight percent of a glycoside surfactant;
c. from about 0.01 to about 10 weight percent of ethylene diamine tetraacetic acid or alkali metal salts thereof; and
d. from about 50 to about 99.98 weight percent water; and in which the weight ratio of the germicidal quaternary ammonium halide compound to the glycoside surfactant is at least about 0.65:1.

15. The method of claim 14 wherein the weight ratio of the germicidal quaternary ammonium halide compound to the glycoside surfactant is at least about 1:1.

16. A method of disinfecting a hard surface which comprises applying thereto a liquid disinfectant cleaning composition which, on a total composition weight basis, comprises:

a. from about 0.05 to about 10 weight percent of a germicidal quaternary ammonium halide compound;

b. from about 0.01 to about 10 weight percent of a glycoside surfactant;

c. from about 0.01 to about 10 weight percent of ethylene diamine tetraacetic acid or alkali metal salts thereof; and d. from about 50 to about 99.94 weight percent water; and in which the weight ratio of the germicidal quaternary ammonium halide compound to the glycoside surfactant is at least about 0.65:1.

17. The method of claim 16 wherein the weight ratio of the germicidal quaternary ammonium halide compound to the glycoside surfactant is at least about 1:1.

* * * * *